(12) United States Patent
Meyer

(10) Patent No.: US 7,584,168 B2
(45) Date of Patent: Sep. 1, 2009

(54) METHOD AND DEVICE FOR THE GENERATION OF A CLASSIFICATION TREE TO UNIFY THE SUPERVISED AND UNSUPERVISED APPROACHES, CORRESPONDING COMPUTER PACKAGE AND STORAGE MEANS

(75) Inventor: Franck Meyer, Lannion (FR)

(73) Assignee: France Telecom, Paris (FR)

( * ) Notice: Subject to any disclaimer, the term of this patent is extended or adjusted under 35 U.S.C. 154(b) by 297 days.

(21) Appl. No.: 11/354,265

(22) Filed: Feb. 14, 2006

(65) Prior Publication Data

US 2006/0195415 A1 Aug. 31, 2006

(30) Foreign Application Priority Data

Feb. 14, 2005 (FR) .................................. 05 01487

(51) Int. Cl.
*G06F 7/00* (2006.01)
(52) U.S. Cl. .............................. 707/1; 707/10; 707/100; 707/101; 707/104.1; 706/20; 706/55
(58) Field of Classification Search ...................... 707/1, 707/100–102, 104.1, 10; 706/20, 45–46, 706/55; 435/6, 7.1; 702/19, 20
See application file for complete search history.

(56) References Cited

U.S. PATENT DOCUMENTS 5,444,796 A * 8/1995 Ornstein ....................... 706/25

(Continued)

FOREIGN PATENT DOCUMENTS

FR 2 851 353 2/2003

OTHER PUBLICATIONS

"A Bayes Optimal Approach for Partitioning the Values of Categorical Attributes"—Mare Boulle—Journal of Machine Learning—Oct. 4, 2004 (pp. 1431-1452).*

(Continued)

*Primary Examiner*—Jean B. Fleurantin
*Assistant Examiner*—Anh Ly
(74) *Attorney, Agent, or Firm*—Westman, Champlin & Kelly, P.A.

(57) ABSTRACT

A method and apparatus are provided for the generation of a classification tree as a function of a classification model and from a set of data to be classified, described by a set of attributes. The method includes a step for obtaining said classification model, itself comprising a step for defining a mode of use for each attribute, which comprises specifying which property or properties are possessed by said attribute among the following at least two properties, which are not exclusive of each other: an attribute is marked target if it has to be explained; an attribute is marked taboo if it has not to be used as an explanatory attribute, an attribute not marked taboo being an explanatory attribute. Furthermore, the classification model belongs to the group comprising: supervised classification models with one target attribute, in each of which a single attribute is marked target and taboo, the attributes that are not marked target being not marked taboo; supervised classification models with several target attributes, in each of which at least two attributes, but not all the attributes, are marked target and taboo, the attributes not marked target being not marked taboo; and unsupervised classification models, in each of which all the attributes are marked target and at least one attribute is not marked taboo.

11 Claims, 3 Drawing Sheets

|  | Attribute 1 | Attribute 2 | (...) | (...) | Attribute P |
|---|---|---|---|---|---|
| data 1 |  |  |  |  |  |
| data 2 |  |  |  |  |  |
| (...) |  |  |  |  |  |
| (...) |  |  |  |  |  |
| (...) |  |  |  |  |  |
| data N |  |  |  |  |  |

U.S. PATENT DOCUMENTS

| | | | | |
|---|---|---|---|---|
| 5,590,218 A * | 12/1996 | Ornstein | | 382/157 |
| 5,806,056 A * | 9/1998 | Hekmatpour | | 706/50 |
| 5,822,745 A * | 10/1998 | Hekmatpour | | 706/59 |
| 5,870,768 A * | 2/1999 | Hekmatpour | | 715/207 |
| 6,100,901 A * | 8/2000 | Mohda et al. | | 345/440 |
| 6,230,151 B1 * | 5/2001 | Agrawal et al. | | 706/12 |
| 6,233,575 B1 * | 5/2001 | Agrawal et al. | | 707/6 |
| 6,278,464 B1 * | 8/2001 | Kohavi et al. | | 345/440 |
| 6,336,106 B1 * | 1/2002 | Evans | | 706/12 |
| 6,496,816 B1 * | 12/2002 | Thiesson et al. | | 706/52 |
| 6,505,185 B1 * | 1/2003 | Chickering | | 707/100 |
| 6,507,832 B1 * | 1/2003 | Evans et al. | | 706/61 |
| 6,513,025 B1 * | 1/2003 | Rosen | | 706/45 |
| 6,906,320 B2 * | 6/2005 | Sachs et al. | | 702/23 |
| 6,950,786 B1 * | 9/2005 | Sonneland et al. | | 703/2 |
| 7,117,185 B1 * | 10/2006 | Aliferis et al. | | 706/12 |
| 7,143,046 B2 * | 11/2006 | Babu et al. | | 704/500 |
| 7,200,267 B1 * | 4/2007 | Bennett et al. | | 382/187 |
| 7,341,838 B2 * | 3/2008 | Buechler et al. | | 435/7.1 |
| 7,359,857 B2 * | 4/2008 | Mahe et al. | | 704/228 |
| 7,363,126 B1 * | 4/2008 | Zhong et al. | | 701/25 |
| 7,451,065 B2 * | 11/2008 | Pednault et al. | | 707/101 |
| 2001/0037324 A1 * | 11/2001 | Agrawal et al. | | 707/1 |
| 2002/0127597 A1 * | 9/2002 | Chen et al. | | 435/7.1 |
| 2003/0088565 A1 * | 5/2003 | Walter et al. | | 707/6 |
| 2003/0115175 A1 * | 6/2003 | Baatz et al. | | 707/1 |
| 2003/0126103 A1 * | 7/2003 | Chen et al. | | 706/50 |
| 2003/0130855 A1 * | 7/2003 | Babu et al. | | 704/500 |
| 2003/0212691 A1 * | 11/2003 | Kuntala et al. | | 707/100 |
| 2004/0073537 A1 * | 4/2004 | Thiesson et al. | | 707/2 |
| 2004/0153249 A1 * | 8/2004 | Zhang et al. | | 702/19 |
| 2004/0172241 A1 * | 9/2004 | Mahe et al. | | 704/205 |
| 2004/0181441 A1 * | 9/2004 | Fung et al. | | 705/7 |
| 2004/0186815 A1 * | 9/2004 | Stockfisch | | 706/16 |
| 2004/0193573 A1 * | 9/2004 | Meyer | | 707/1 |
| 2004/0215430 A1 * | 10/2004 | Huddleston et al. | | 703/2 |
| 2004/0221855 A1 * | 11/2004 | Ashton | | 128/898 |
| 2004/0225651 A1 * | 11/2004 | Musgrove et al. | | 707/4 |
| 2004/0260476 A1 * | 12/2004 | Borgos et al. | | 702/14 |
| 2005/0004880 A1 * | 1/2005 | Musgrove et al. | | 705/400 |
| 2005/0064511 A1 * | 3/2005 | Buechler et al. | | 435/7.1 |
| 2005/0102292 A1 * | 5/2005 | Tamayo et al. | | 707/10 |
| 2005/0172027 A1 * | 8/2005 | Castellanos et al. | | 707/100 |
| 2005/0244890 A1 * | 11/2005 | Davies et al. | | 435/7.1 |
| 2005/0280813 A1 * | 12/2005 | Jones et al. | | 356/300 |
| 2006/0074824 A1 * | 4/2006 | Li | | 706/20 |
| 2006/0112043 A1 * | 5/2006 | Oliver et al. | | 706/20 |
| 2006/0136462 A1 * | 6/2006 | Campos et al. | | 707/102 |
| 2006/0152263 A1 * | 7/2006 | Rademacher | | 327/175 |
| 2006/0167784 A1 * | 7/2006 | Hoffberg | | 705/37 |
| 2006/0177837 A1 * | 8/2006 | Borozan et al. | | 435/6 |
| 2006/0248031 A1 * | 11/2006 | Kates et al. | | 706/25 |
| 2008/0147473 A1 * | 6/2008 | Zhong et al. | | 705/9 |

OTHER PUBLICATIONS

"The user of a Bayesian Neural Network Model for Classification Tasks"—Anders Holst, Stockholms University, Sep. 1997 (pp. 1-120).*

"Knowledge discovery from distributed and textual data" Vincent Wing-Sing Cho—Hong Kong Jun. 1999, The Hong Kong University of Science and technology (computer Science) (pp. 1-125).*

H. Frigui et al., "Unsupervised Learning of Prototypes and Attribute Weights," www.ElsevierComputerscience.com, Pattern Recognition Society, vol. 37, No. 3, Mar. 2004. pp. 567-568.

M. Chavent, "A Monothetic Clustering Method," Pattern Recognition Letters, vol. 19, No. 11, Sep. 1998, pp. 989-996.

D. Brown et al., "Classification Trees with Optimal Multivariate Decision Nodes," Pattern Recognition Letters, vol. 17, No. 7, Jun. 1996, pp. 699-703.

* cited by examiner

|  | Attribute 1 | Attribute 2 | (...) | (...) | Attribute P |
|---|---|---|---|---|---|
| data 1 | | | | | |
| data 2 | | | | | |
| (...) | | | | | |
| (...) | | | | | |
| (...) | | | | | |
| data N | | | | | |

|  | Attribute 1 | (...) | Attribute P |
|---|---|---|---|
| Masked attribute yes/no | | | |
| Target attribute yes/no | | | |
| Taboo attribute yes/no | | | |

| Condition 1 ||| Condition i ||| Condition Cmax |||
|---|---|---|---|---|---|---|---|---|
| Attribute No. | Operator No. | Value No. | Attribute No. | Operator No. | Value No. | Attribute No. | Operator No. | Value No. |
| 2 | 1 | 10 | 10 | 2 | 17 | 7 | 1 | 60 |

METHOD AND DEVICE FOR THE GENERATION OF A CLASSIFICATION TREE TO UNIFY THE SUPERVISED AND UNSUPERVISED APPROACHES, CORRESPONDING COMPUTER PACKAGE AND STORAGE MEANS

CROSS-REFERENCE TO RELATED APPLICATION

None.

FIELD OF THE INVENTION

The disclosure falls within the field of data-mining software programs and statistical methods. A related field is that of database management systems, for example systems for the management of documentary databases.

An embodiment enables the detection of complex statistical relationships and the performance of statistical prediction.

The disclosure further relates to a method of automatic classification that can be used to generate a multi-criterion decision tree explaining one or more target variables (also called attributes) of different natures, from a data source (i.e. a set of data to be classified described by a set of attributes).

BACKGROUND OF THE INVENTION

Decision tree generators (called decision trees) are systems that are very much in vogue in automated data analysis. They can be used to analyze large quantities of data. They enable the building of a test tree used to describe the way in which to determine a variable (called a target variable) as a function of a set of explanatory variables.

In a decision tree (also called a classification tree), each node is a test of the value of an attribute of the data to be classified. Each leaf of the decision tree indicates the value of the variable to be explained, known as a target variable.

The most widely known decision trees are the CART, C4.5, C5 and CHAID.

FIG. 1 shows the principle implied when the data is referred to. The data may be represented, for example, by the rows of a table $100_1$ to $100_N$, and the attributes, also called variables, or properties by the columns of the table $101_1$ to $101_N$.

A first known technique is that of the CART decision tree system (see Breiman L, Friedman J. H., Olshen R. A. and Stone C J, "Classification and Regression Trees", Chapman and Hall, 1984). This method of data classification, which is ready well known in "data mining", is used to generate a decision tree as a function of one and only one target variable. This is a supervised method with one target variable. The attributes of the data processed may be continuous or discrete. The target variables may be continuous or discrete.

A second prior art technique is that of the unsupervised DIVOP system (see Chavent M, "A monothetic clustering method", Pattern Recognition Letters 19, p. 989-996, 1998). This unsupervised classification method is used to generate a decision tree without target variable, for continuous variables only. It proposes an alternative to the very widely known unsupervised classification method called the "upward (or ascending) hierarchical classification method" in generating a decision tree instead of a dendrogram (a dendrogram is an upward grouping binary tree that uses no test nodes). This system works only for continuous variables. It cannot be used to manage a target variable.

The first known technique (the CART technique) cannot be used to perform unsupervised classification without target variable. Indeed, the CART technique needs one (and only one) target variable to generate a decision tree. It therefore cannot be used for unsupervised classification (also known as clustering). Furthermore, it cannot generate a decision tree in taking account of several target variables.

The drawback of the second prior art technique (known as the DIVOP technique) is that it is limited to integrally continuous data, and to unsupervised classification. The DIVOP method therefore cannot be used for supervised classification to explain a target variable. It cannot be used on data comprising discrete attributes (with qualitative values) which, however, are very numerous in real cases.

Furthermore, the two known techniques (the CART and DIVOP techniques) cannot be used to generate a decision tree based on multivariate rules, namely a tree using several explanatory attributes at a time in the test nodes. However, other methods allow such generation but they do so within the restricted framework of supervised analysis for numerical explanatory attributes, performed chiefly by linear regression.

Furthermore, the modeling work of the statistician or data analyst always consists of the generation, by statistical tools for example, of an unsupervised model (in the case of the DIVOP technique) for exploratory analysis for example, or a supervised model (in the case of the CART technique), for a single target variable. The statistician or data analyst wishing to perform either of these tasks does not have a single type of tool at his disposal but must use one type of tool or the other. Furthermore, if several target variables are to be studied, it is generally necessary to make several supervised models, each dedicated to the modeling of one of the variables. This is particularly true for models made by means of decision trees.

SUMMARY OF THE INVENTION

An embodiment of the present invention is directed to a method for the generation of a classification tree as a function of a classification model and from a set of data to be classified, described by a set of attributes. According to the embodiment, the method comprises a step for obtaining said classification model, itself comprising a step for defining a mode of use for each attribute, consisting in specifying which property or properties are possessed by said attribute among the following at least two properties, which are not exclusive of each other:

an attribute is marked target if it has to be explained;
an attribute is marked taboo if it has not to be used as an explanatory attribute, an attribute not marked taboo being an explanatory attribute.

Furthermore, said classification model belongs to the group comprising:

supervised classification models with one target attribute, in each of which a single attribute is marked target and taboo, the attributes that are not marked target being not marked taboo;

supervised classification models with several target attributes, in each of which at least two attributes, but not all the attributes, are marked target and taboo, the attributes not marked target being not marked taboo; and unsupervised classification models, in each of which all the attributes are marked target and at least one attribute is not marked taboo.

It is important to recall that the classic methods of supervised analysis use only the following properties to define the mode of use of the variables (or attributes) in a module:

variable masked at input: yes/no (also called input variable: yes/no);

target variable: yes/no.

The variables masked at input are simply masked during the processing. The operation takes place as if the work were being done with data in which the columns of these variables had been eliminated. This principle of the masked variables shall therefore no longer be described in detail herein. The masked variables should not be mistaken for the variables marked taboo.

However, what is important to note in the prior art techniques is the mode of management of the target variables. By default, in the classic decision trees, it is always the target variable that has the implicit property by which it cannot be expressed, in the generated model, in the form of a variable on which the test would be made. Indeed, there would be no utility in producing a decision tree in which the target variable is self-explanatory.

The general principle of an embodiment of the invention consists precisely in explicitly introducing a new property (a taboo) that does not exclude the already known "target" property to define the mode of use of each attribute.

This quite novel and inventive approach unifies the supervised and unsupervised approaches in a same system, i.e. it defines different classification models (unsupervised classification, supervised classification with one target variable and supervised classification with several target variables) that can all be used by a same method for the generation of a classification tree (also called a decision tree). An embodiment of the invention therefore relates to an extension of the supervised methods with only one target variable (in the case of the CART technique) to enable work with several target variables at a time or with no target variable.

More specifically, an embodiment of the invention enables the management of:

the case of supervised classification with only one target variable, in marking this variable as both target and taboo. As indicated here above, the property "taboo" is implicit in CART type prior art techniques;

the case of supervised classification with several target variables, in marking these variables as both target and taboo. In the absence of an explicit property "taboo" in the prior art techniques (especially CART), it was not possible to obtain a supervised classification model with several target variables;

the case in which a variable is a target but can also be explanatory (in this case it is marked target and not taboo). This is meaningful especially when all the variables are targets, because it is according to this principle that an unsupervised classification can be made by means of a decision tree. This furthermore makes it possible, even when it is sought to have an unsupervised model, to mark certain variables as taboo (namely non-explanatory) while at the same time taking them into account in the model (since they are marked target).

Advantageously, the following can be distinguished among the unsupervised classification models:

those in each of which all the attributes are marked target, and no attribute is marked taboo; and those in each of which all the attributes are marked target, and at least one attribute, but not all the attributes, is marked taboo.

Advantageously, the definition of the mode of use for each attribute also takes account of the following property, not excluding the other two properties: an attribute is marked as being masked if it has not to be taken into account to define said classification model.

In other words, an embodiment of the present invention is compatible with the notion (known per se) of a masked attribute.

Classically, said decision tree comprises at least one node enabling the definition of a partition on a data subset received by said node, each node being a set of partitioning rules comprising at least one rule defined by at least one condition on at least one of the attributes. According to a preferred characteristic of an embodiment of the invention, to generate the set of rules of each node, the method comprises the following steps, performed iteratively so long as at least one end-of-exploration criterion has not been verified:

a) obtaining a new set of rules enabling the definition of a new partition on the data subset received by the node, the condition or conditions that define each rule pertaining solely to one or more attributes not marked taboo;

b) first evaluation of the quality of the new partition, by obtaining a new value of a first indicator computed with the set of data, only the attributes marked target influencing said first indicator;

c) if the quality of the new partition, evaluated with the first criterion, is greater than that of the partitions evaluated during the preceding iterations, also with the first criterion, the new value of the first indicator is stored and becomes a current optimal value, and the new set of rules is stored and becomes a current optimal set of rules, so that, ultimately, the set of rules of said node is the current optimal set of rules at the time when an end-of-exploration criterion is verified.

It must be noted that an embodiment of the invention enables the generation of a decision tree with at least one multivariate test, should this at least one rule be a test based on at least two attributes not marked taboo.

Preferably, the obtaining of a new value of the indicator, for a new partition, comprises the following steps:

a weight equal to one is assigned to each of the original attributes marked target and a weight equal to zero is assigned to each of the original attributes not marked target;

the set of original attributes is re-encoded as a set of attributes re-encoded $Z_1 \ldots Z_Q$ such that:

if said original attribute $A_j$ is of a discrete type and possesses N different modalities, it is re-encoded according to a full disjunctive re-encoding into N re-encoded attributes $Z_{d(j)} \ldots Z_{f(j)}$ having [0; 1] as the value domain, with $N=f(j)-d(j)+1$, each of the N re-encoded attributes being assigned a weight identical to that of the original attribute from which they are derived;

if said original attribute $A_j$ is of a continuous type, it is re-encoded as a re-encoded attribute, in standardizing its value domain at [0; 1], said re-encoded attribute being assigned a weight identical to that of the original attribute from which it is derived;

the new partition is re-encoded in the space of the re-encoded attributes;

the intra-class inertia of the new partition, re-encoded in the space of the re-encoded attributes, is computed.

The passage into the space of the re-encoded attributes enables the computation of the intra-class inertia whatever the type (discrete or continuous) of each of the attributes marked target that influences this indicator. Advantageously, the intra-class inertia is defined by:

$$\text{Intra}(P) = \sum_{j=1}^{K}\left(\sum_{x_1 \in C_j} p_i d^2(x_i, g_k)\right)$$

where P is a partition of n points, formed by K subsets $C_1 \ldots C_K$, d(.) is a function of distance between two points, $p_i$ is the weight of the point number i, the sum of the weights $p_i$ being equal to one, and $g_k$ is the center of gravity of the set of points belonging to the subset $C_k$, and the distance function d(.), for the data re-encoded in the space of the attributes re-encoded $Z_1 \ldots Z_Q$ is defined by:

$$d(d_a, d_b) = \sqrt{\sum_{j=1}^{Q}(DistanceZ_j(Z_{ja}, Z_{jb})poidsZ(j))^2}$$

where $d_a(Z_{1a}, Z_{2a}, \ldots Z_{Qa})$ and $d_b(Z_{1b}, Z_{2b}, \ldots Z_{Qb})$ are two pieces of data re-encoded in the space of the re-encoded data $Z_1 \ldots Z_Q$, and:

Distance $Z_j(x_j, y_j) = |x_j - y_j|$ if $Z_j$ is a re-encoded attribute coming from a continuous type of attribute, Distance $Z_j(x_j, y_j) = |x_j - y_j|/2$ if $Z_j$ is a re-encoded attribute coming from a full disjunctive re-encoding of a discrete attribute.

Advantageously, the step of obtaining a new set of rules, enabling the definition of a new partition, is performed according to a mode of stochastic generation of the partitions.

Stochastic generation modes have the advantage of being less costly than exhaustive generation modes. It is clear however that an embodiment of the invention also covers the case where these exhaustive generation modes are used.

Advantageously, the mode of stochastic generation of the partition is based on a combinatorial optimization meta-heuristic of the VNS or "variable neighborhood search" type.

According to an advantageous variant, the step c) is replaced by the following step:

c') if the quality of the new partition, evaluated with the first criterion, is greater than that of the partitions evaluated during the previous iterations, with the first criterion, then:
   a second evaluation is made of the quality of the new partition, by obtaining a new value of a second indicator, having the same nature as the first indicator but being computed with a subset of test data;
   if the quality of the new partition, evaluated with the second criterion, is greater than that of the partition evaluated during the previous iterations, with the second criterion, the new values of the first and second indicators are stored and become current optimal values and the new set of rules is stored and becomes a current optimal set of rules,
   if the quality of the new partition, evaluated with the second criterion, is lower than or equal to that of the partition evaluated during the previous iterations, with the second criterion, a counter is implemented and, if the counter has reached a determined threshold, an end-of-exploration criterion is considered to have been verified; if not the new values of the first and second indicators are stored and become current optimal values and the new set of rules is stored and becomes a current optimal set of rules.

An embodiment of the invention also relates to a computer program product comprising program code instructions to execute the steps of the above-mentioned method according to an embodiment of the invention, when said program is executed on a computer.

An embodiment of the invention also relates to a computer-readable storage means, which may be totally or partially detachable, storing a set of instructions executable by said computer to implement the above-mentioned method according to an embodiment of the invention.

An embodiment of the invention also relates to a device for the generation of a classification tree as a function of a classification model and from a set of data to be classified, described by a set of attributes. According to an embodiment of the invention, this device comprises means for obtaining said classification model, the means themselves comprising means for defining a mode of use for each attribute, making it possible to specify which property or properties are possessed by said attribute among the at least two following properties, which are not exclusive of each other: an attribute is marked taboo if it has not to be used as an explanatory attribute, an attribute not marked taboo being an explanatory attribute. Furthermore, said classification model belongs to the above-mentioned group, comprising supervised classification models with one target attribute, in each of which a single attribute is marked target and taboo, the attributes that are not marked target being not marked taboo; supervised classification models with several target attributes, in each of which at least two attributes, but not all the attributes, are marked target and taboo, the attributes not marked target being not marked taboo; and unsupervised classification models, in each of which all the attributes are marked target and at least one attribute is not marked taboo.

Other features and advantages of one or more embodiments of the invention shall appear from the following description of an embodiment of the invention given by way of an indicative and non-restrictive example, and from the appended drawings.

DETAILED DESCRIPTION OF ILLUSTRATIVE EMBODIMENTS

1.1 General Scheme of the Device

An embodiment of the invention relates to a device (and a corresponding method) for the generation of a decision tree and/or the application of a decision tree to data.

An embodiment of the invention can be applied, for example, in the field of systems for the management of documentary databases.

Figures 1, 3, 4, 6:
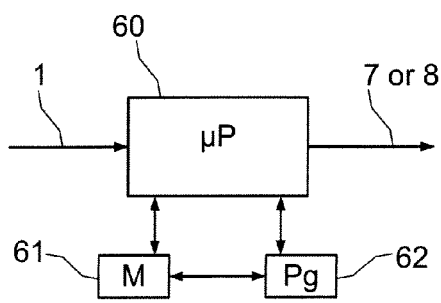
FIG. 1 shows an example of a prior art type of data format capable of being processed by the method of an embodiment of the invention for the generation of a decision tree.
FIG. 3 is an example of a table of properties of attributes, used by the device according to the embodiment shown in FIG. 2.
FIG. 4 is an example of unambiguous numbering of rules with Cmax conditions, in the case of an exhaustive exploration of the space of the rules.
FIG. 6 shows the structure of the device according to the embodiment of FIG. 2.
Figure 2:
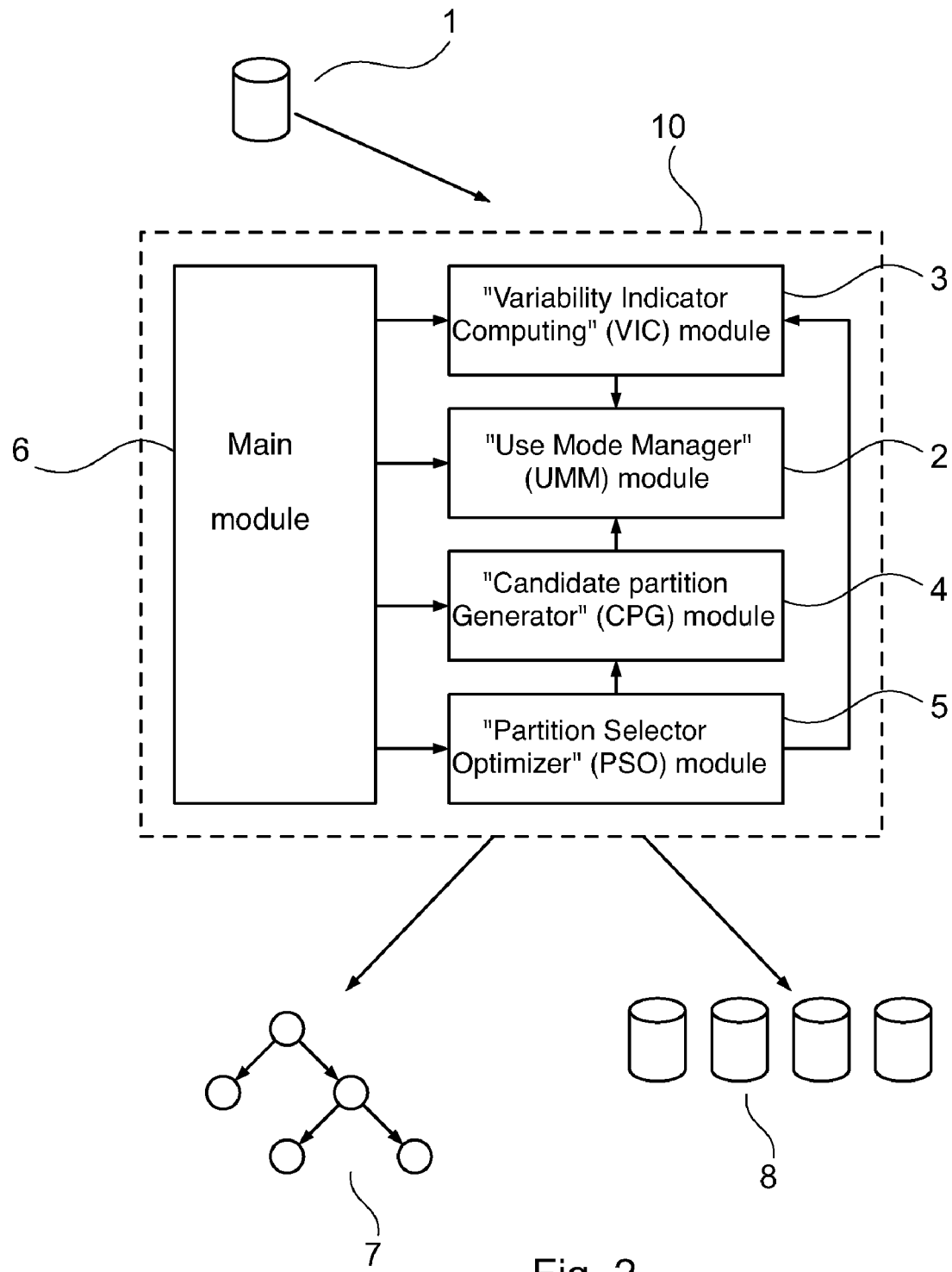
FIG. 2 is a block diagram of a particular embodiment of the device according to an embodiment of the invention for the generation of a decision tree and/or application of a decision tree to data.

In the particular embodiment illustrated by the block diagram of FIG. 2, the device 10 according to an embodiment of the invention receives at input, for example, a data table 1 coming from a database management system (DBMS). This data table 1 is, for example, of the type illustrated in FIG. 1 where each column corresponds to an attribute and each row corresponds to a recording (a piece of data).

In the application to a documentary database, a row corresponds to a document and a column corresponds to a descriptive variable of the document. A descriptive variable of a document or attribute of a document is, for example, a count of words present in the document (the number of appearances of a predetermined word in the document), the size of the document (the number of characters), its date of creation, its date of modification, its computer encoding format, whether or not it contains images, meta-data (containing for example the author's name, or the nature of the document).

Other possible variables of document may be, for example, the class or type of publication (novel, poetry, comic strip or comic book etc), the subject that it comes under (travel, cookery, information technology etc).

At output, the device 10 according to an embodiment of the invention generates a data explanatory model in the form of a decision tree 7 and/or data 8 classified according to a preliminarily generated decision tree.

It contains the following computer program modules:
- a "Use Mode Manager" (UMM) module 2 to manage the mode of use of the attributes in supervised or unsupervised mode;
- a "Variability Indicator Computing" (VIC) module 3 to compute a variability indicator as a function of the mode specified by the Use Mode Manager module 2 for a partition of a data subset and for any set of continuous or discrete attributes;
- a "Candidate Partition Generator" (CPG) module 4 to generate candidate partitions as a function of the modes specified by the Use Mode Manager module 2;
- a "Partition Selector Optimizer" (PSO) module 5 to optimize partition selection on the basis of the indicator computed by the <<Variability Indicator Computing>> module 3 for operations generated by the partition candidate generator 4; and
- a main module (Main) 6 coordinating the above-mentioned modules 2 to 5, the inputs 1/outputs 7, 8, a user interface (not shown), the recursive application of the partition selection optimizer module 5 etc.

Each of the modules 2 to 6 is presented successively here below.

1.2 Attributes UMM (Use Mode Manager) Module

The Use Mode Manager (UMM) module 2 is a computer program module used to manage the masked/target/taboo modes (also called properties) of the attributes of the data to be analyzed.

To be able to process the cases requested by the user, the use mode management module 2 manages a table of the properties of the attribute at input, a table having for example the form shown in FIG. 3. This table, hereinafter called a UMM table, stores the properties, i.e. whether masked or not masked (row $300_1$), target or not target (row $300_2$), taboo or not taboo (row $300_3$) (i.e. not explanatory or explanatory) of each attribute (columns $301_1$ to $301_P$) (also called a variable). A target may be taboo or non-taboo. In practice, a non-target attribute is also marked non-taboo (that is, explanatory) so that there is no attribute that is not target and taboo, and hence of no interest.

For the masked variables, the principle is similar to that of the prior art and is therefore not described in detail here. It may be recalled that this principle simply entails totally ignoring the existence of the masked variables.

The following is the mode of management of the UMM table of properties of attributes for the various targets and/or explanatory (non-masked) attributes:

Case 1: the user asks for a classic supervised analysis, with a single target variable $V_i$. In this case, to obtain a supervised classification model with only one target variable, the target variable $V_i$ is marked as such and is also marked taboo. The other variables (not marked target variables) are not marked taboo (they are therefore explanatory).

In the documentary field, the target variable may, for example, be the subject class Case 2: the user asks for supervised analysis with several target variables $V_i$, $V_j$, $V_k$ . . . in this case, to obtain a supervised classification model with several target variables, the target variables $V_i$, $V_j$, $V_k$ . . . are marked search and are also marked taboo. The other variables (not marked target) are not marked taboo (they are therefore explanatory).

In the documentary field, the variable target variables may, for example, be the type of document (novel, article, thesis etc), the subject of the document (politics, information technology, science etc).

Case 3: the user asks for unsupervised analysis (clustering). In this case, to obtain an unsupervised classification model, the variables are all marked target and no variable is marked taboo.

Case 4: the user asks for unsupervised analysis (clustering) but furthermore wants that certain variables $V_i$, $V_j$ . . . (but not the totality of the variables) should not act as explanatory variables of the model generated. In this case, the variables are all marked target and only the variables specified as such are marked taboo.

In the documentary field, there is therefore no specified class of document (no particular target variable), and the document will be classified on the basis of the values of their descriptive attributes, for example the key-word count.

A man/machine interface (for example a graphic user interface) enables the user to select one of the above four cases, and define the properties (target, taboo, masked) of the variables.

1.3 The VIC (<<Variability Indicator Computing>>) Module

1.3.1 Notations and General Principles

Let E be the set of data. Let $A_1 \ldots A_m$ be the set of attributes that describe the data. Let $d_1 \ldots d_n$ be the data proper. It will be noted that a practical mode of representation (which is not a restrictive example) of this data is a table with n rows and m columns (see FIG. 1) where each column represents an attribute and each row represents a piece of data.

Let $\text{Dom}(A_1) \ldots \text{Dom}(A_m)$ be the sets of values taken by the attributes $A_1 \ldots A_m$. Two cases may be distinguished: for a continuous attribute $A_i$, $\text{Dom}(A_i)$ is included in R, set of the real values; for a discrete attribute $A_i$, then $\text{Dom}(A_i)$ is the set of discrete values (called modalities) of this attribute.

A partition on a set of data E is a set P of subsets $\{P_1, \ldots P_k\}$ such that any $P_i$ is included in E, such that $P_i \cap P_j = \emptyset$ if $i \neq j$, and such that $U_{i=1 \text{ à } k} P_i = E$.

A bipartition is a partition into two parts of a set E: $P = \{P_1, \ldots P_2\}$ and $E = P_1 \cup P_2$.

1.3.2 Inertia of a Partition

The inertia of a cloud of n points X, having g as its center of gravity is:

$$\text{Inertia}(X) = \frac{1}{n}\sum_{i=1}^{i=n} d(x_i, g)^2$$

with d(.): function of distance between two points.

This formula is valid for data that can be represented by points in a space, i.e. objects having coordinates, hence data having continuous attributes.

The intra-class inertia of n points distributed in a partition P formed by K subsets $C_1 \ldots C_K$ is defined by:

$$\text{Intra}(P) = \sum_{j=1}^{K}\left(\sum_{x_1 \in C_j} p_i d^2(x_i, g_k)\right)$$

with d(.): function of distance between two points.

with $p_i$: the weight of the point No. i, the sum of the weights $p_i$ being equal to 1 (the weight of each piece of data is, by default, uniform and has a value 1/N; it must be noted that, in this description, it should not be taken for the weight of each attribute and re-encoded attribute).

with $g_k$: the center of gravity of the set of points belonging to the subset $C_k$.

1.3.3 Functional Description of the VIC Module

The "Variability Indicator Computing" (VIC) module 3 must be capable of the computation, for each partition $P=\{P_1, P_2, \ldots, P_k\}$ of the initial set E, or of a subset F included in E, of a mathematical criterion on the attributes $A_i$ having the following properties:

the criterion can be computed for the continuous attributes as well as for the discrete attributes:
    the criterion can be computed for any sequence of continuous values $v_1 \ldots v_m$, with $v_i$ belonging to R;
    the criterion can be computed for any sequence of discrete values $v_1 \ldots v_m$, with $v_i$ belonging to $\text{Dom}(A_i)$;
  for any continuous attribute X, the criterion is invariant according to any affine transformation $X'=aX+b$;
  for any discrete attribute X, the criterion invariant according to any bijective re-encoding of the modalities;
  the criterion has the same range of values for any attribute, whether continuous or discrete;
  the criterion indicates a level of variability for each attribute. In particular, it is zero for any sequence of identical values and different from 0 for any sequence of values comprising at least two different values.

The set of properties thus defined ensures that the criterion can be summed on all the attributes and that this summing has one sense, whatever the fields of values $\text{Dom}(A_i)$ of the different attributes.

The "Variability Indicator Computing" (VIC) module 3 computes the criterion thus defined on the set of the attributes $A_i$, for the partition P. It then totals up the criterion for all the attributes $A_i$ marked as target in the Use Mode Manager (UMM) module 2.

1.3.4 Description of One Embodiment of the VIC Module

The "Variability Indicator Computing" (VIC) module 3 is a computer program module used to evaluate the quality of a partition of a set of data into K subsets of data.

The intra-class inertia is a classic indicator to evaluate the quality of a partition. In one of its possible embodiments therefore, the "Variability Indicator Computing" (VIC) module 3 succeeds in computing an intra-class inertia from data with attributes which may be continuous (with different time scales) as well as discrete and therefore without any notion of a center of gravity, furthermore complying with the five properties described in the above functional description.

In one particular embodiment, the "Variability Indicator Computing" (VIC) module 3 is formed by the following three algorithms:

an initialization algorithm (VIC_Init) used to initialize the re-encoding parameters;
  a re-encoding algorithm ("VIC_Re-encode)" used to re-encode the data with the attributes that are continuous and standardized in [0 . . . 1];
  an indicator computing function ("VIC_Indicator") which, for any partition P of a subset of the initial set of data E, sends an indicator of quality of the partition.

For any continuous attribute $A_j$, $\max(A_j)$ and $\min(A_j)$ respectively denote the maximum and minimum values taken by $A_j$ as a whole with a value $\text{Dom}(A_j)$.

For any discrete attribute, $A_j$, $\text{nbMod}(A_j)$ denotes the number of different modalities of $A_j$, namely the cardinal of Dom $(A_j)$.

The weight of the original attributes is determined by using the use mode management (UMM) module 2 which indicates the target attributes. An InitialWeight table stores the weights (0 or 1) of each original attribute. A table "weightZ" stores the weights (0 or 1) of the attributes that come from the re-encoding. A "Mapping[ ]" table, not described in detail, performs the mapping between the initial attributes and their re-encoded versions.

The pseudo-code of the initialization algorithm (<<VIC_Init>>) is, for example:

---
Algorithm VIC_Init(set of initial data E)
Start
For each attribute Aj
    If $A_j$ is of continuous type
        determine $\max(A_j)$ and $\min(A_j)$
    If $A_j$ is of a discrete type
        determine its set of modality $\text{Dom}(A_j)$
    End for
    If $A_j$ is of a target type (call "user mode manager" (UMM) module 2
        then WeightInit[j]=1 Else WeightInit[j]= 0
End for
End Algorithm
---

The pseudo-code of the re-encoding algorithm ("VIC re-encode) is for example:

---
Re-encodeAlgorithm (set of initial data E) : output: set E' with the re-encoded attributes $Z_1 \ldots Z_Q$
Start -continued

```
For each attribute A_j
    If A_j is of a discrete type
        then
            re-encode A_j in a full disjunctive encoding in Z_d(j) ...Z_f(j), with
            NbMod(A_j)=f(j)-d(j)+1
            For each new attribute Z_i (for i=d(j) à f(j) ) coming from the full
            disjunctive encoding of A_j
                WeightZ[i]=WeightInitial[j]
            End for
    If A_j is of a continuous type
        Then standardize A_j in [0;1] from the data Max(A_j) and Min(A_j)
End for
End Algorithm
```

The full disjunctive encoding of a discrete attribute consists in creating a new attribute for each of its modalities and, for each initial value of the attribute, in encoding 0 for the new attributes that do not correspond to this value and in encoding 1 for the attribute that corresponds to this value. Full disjunctive encoding is a field known in the prior art (to IT specialists, statisticians and data-miners) and shall not be described in further detail.

At the output from the re-encoding operation, all the re-encoded attributes $Z_1 \ldots Z_Q$ are continuous and all have the domain value [0;1].

A general mapping is kept so as to enable correspondence can be obtained between any continuous attribute $A_j$ and its re-encoded attribute $Z_j$, and between any discrete attribute $A_j$ and its set of re-encoded attributes $Z_{d(j)} \ldots Z_{f(j)}$. d(j) and f(j) are respectively the starting and ending indices of the re-encoded attributes.

Each partition $P=P_1 \ldots P_K$ in the set of initial data has the same data partition made to correspond with it but by using the new representation $Z_1 \ldots Z_Q$.

In the space of the re-encoded attributes $Z_1 \ldots Z_Q$, any data subset may be represented by a cloud of points, and therefore for any data subset, it is possible to define a barycenter The distance between two values $x_j, y_j$ of each re-encoded attribute $Z_j$ is then defined by:

Distance $Z_j(x_j, y_j) = |x_j - y_j|$ if $Z_j$ has come from a continuous attribute (numerical attribute);

Distance $Z_j(x_j, y_j) = |x_j - y_j|/2$ if $Z_j$ has come from a full disjunctive re-encoding of a discrete attribute (symbolic attribute).

It may be noted that, in the case of a re-encoded attribute coming from a re-encoding of a discrete attribute, the distance is corrected by ½. This is done in order to avoid giving greater weight to the discrete attributes, which have a distance varying from 0 to 2 when they are re-encoded by full disjunctive encoding.

The functional distance for data in the new space of representation of the attributes $Z_1 \ldots Z_Q$ is then defined in a very classic manner:

$$d(d_a, d_b) = \sqrt{\sum_{j=1}^{Q} (DistanceZ_j(Z_{ja}, Z_{jb}) weightZ(j))^2}$$

where $d_a(Z_{1a}, Z_{2a}, \ldots Z_{Qa})$ and $d_b(Z_{1b}, Z_{2b}, \ldots Z_{Qb})$ are two pieces of data re-encoded in the space of the re-encoded attributes $Z_1 \ldots Z_Q$.

We can now write the pseudo-code of the indicator computing function ("VIC_Indicator"):

VIC_Indicator function (Input: one data partition $P_1 \ldots P_K$)

Start

Re-encode the partition in the space of the standardized re-encoded attributes $Z_1 \ldots Z_Q$ Compute the intra-class inertia of the partition $P_1 \ldots P_K$ in this re-encoded space $Z_1 \ldots Z_Q$ Return the intra-class inertia End function

1.4 The CPG (Candidate Partition Generator) Module

1.4.1 Notations and General Principles

A binary condition is defined as a simple test made on an attribute. A condition may be tested on a piece of data and may return a value "true" or "false".

A binary rule is a set of conditions (ranging from one to many) linked by "AND" conjunctions. A binary rule may be tested on a piece of data and may return a value "true" or "false".

The notions of partition and bipartition have already been defined further above. A binary condition relating to an attribute $A_j$ is used to define a bipartition of an initial set of data E into two subsets $P_1$ and $P_2$. For this purpose, it is enough to assign the subset $P_1$ the data having the value "true" for the binary test in question and to assign the subset $P_2$ the data having the value "false" for the binary test in question. Thus, any rule with one or more conditions on the attributes of the data can be used to define a bipartition on this data.

Similarly, and by extension, a set of K binary rules is used to define a partition comprising:

at the minimum, two subsets if, for example, all the data having at least one value "false" for one of the rules is assigned to the subset $P_1$, and all the other data to $P_2$;

at the maximum, $2^K$ subsets if each configuration of the values of the K rules corresponds to a subset and vice versa.

1.4.2 Functional Description of the CPG Module

The "Candidate Partition Generator" (CPG) module 4 must be capable of generating candidate partitions which will be accessed and selected by the "Partition Selector Optimizer" module 5 (PSO). Each partition candidate is described according to one or more binary rules. Each binary rule relates to one or more tests made on data attributes. The attributes usable in the tests can only be attributes not marked Taboo in the "Use Mode Manager" (UMM) module 2.

A detailed description given here of the principle for bipartitions. The principle may be generalized to partitions with more than two subsets, in using a correspondence between a set of rules and a partition as explained in the previous paragraph (in this case a "Candidate Partition Generator" module 4 using stochastic exploration, packaged in a module managing several rules at a time).

To create a bipartition, the "Candidate Partition Generator" (CPG) module 4 selects one or more attributes among the data attributes (not masked) from the Use Mode Manager (UMM) module 2 in selecting only attributes not marked Taboo. The target attributes, if they are not marked Taboo, can be selected.

From the selected attributes, the module 4 generates a binary rule. This rule is formed by one or more conditions. Each condition is, for example, of the type $A_i < V_{ij}$ in the case of a continuous attribute $A_i$, or of the type $A_i = M_{ij}$ in the case of a discrete attribute, $V_{ij}$ being a continuous value included in $\text{Dom}(A_i)$ or $M_{ij}$ being a modality encoded in $\text{Dom}(A_i)$.

It can be noted that the partitions may be generated according to several principles:

- an exhaustive principle: all the possible partitions that can be made from rules containing 1 to T conditions, each condition relating to one of the non-taboo attributes $A_i$ and to one among the values possible in $\text{Dom}(A_i)$ are studied.
- a stochastic principle: the possible partitions are generated at random, or improved by a stochastic optimization technique.

The exhaustive mode of generation of the bipartitions may be costly if large quantities of data have to be analyzed. The stochastic mode is therefore preferable and is therefore described in detail as the preferred embodiment. The method uses, for example, a combinatorial optimization meta-heuristic similar to that of genetic algorithms of the VNS or "Variable Neighborhood Search" type.

1.4.3 Description of an Embodiment of the CPG Module

We shall specify the mode of stochastic exploration in the case of a generation of a bipartition rule. The conditions are simplified here to simple tests. This basic language can easily be extended.

The conditions have the form Attribute<Value or Attribute>=Value for the continuous attributes. The conditions have the form Attribute=Value or Attribute!=Value for the discrete values (!=corresponds to "different from").

The designation $\text{Dom}(A_j)$ is again applied to the set of values taken by an attribute $A_j$ in the data.

The "Candidate Partition Generator" module 4 (CPG) is formed by a main algorithm (CPG) and two sub-functions ("Median Neighborhood" and "GenerateACondition") whose pseudo-codes are presented here below. It receives at input: a rule R (which may be zero, i.e. not defined, at initialization), a VNS neighborhood level (which may take the values immediate, near, median, distant) and the maximum size of a rule in number of conjunctions of conditions. It generates a rule at output describing the next bipartition to be tested.

The pseudo-code of the main algorithm ("CPG") is for example:

```
CPG Algorithm(rule R, neighborhood VNS,) : returns one bipartition rule
maximum size of the rule: MaxSize    // static variable initialized by the
                                     //main module 6
Start
If R is zero, then VNS=Distant
According to the value of VNS
    VNS=Immediate:
        Select at random one of the conditions of R, let C be this
        condition
        Let A the attribute to which the condition C relates
        Let V be the value of the test
        If A is of a continuous type
            then V=V+e avec e as a small random variation, positive or
negative
        If A is of a discrete type
            then Replace V by another value drawn at random in
            Dom(A)
        End Immediate Case
    VNS=Near:
        Select at random one of the conditions of R, let C be this
        condition
        Let A be the attribute to which the condition C relates
        Let V be the value of the test
        Replace V by another value drawn at random in Dom(A)
        End Near Case
    VNS=Median:
        R=Median Neighborhood (R)
        End Median Case
    VNS= Distant
        For  j  from  1  to  MaxNeighborhood  Do
            R=Medianneighborhood(R, Maxsize)
        End Distant Case
        // note : MaxNeighborhood is either a constant with, empirically,
        its value ranging for example between 2 and 10, or it is a
        function of the number of attributes of the set of data (a certain
        percentage p of the number of attributes M, with a minimum
        value of 2).
End VNS Case
Return candidate rule R.
End Algorithm.
```

The parameter e may be for example a decreasing function of a parameter of temperature T used by the "Partition Selector Optimizer" (PSO) module 5.

The MediaNeighborhood function randomly modifies a rule according to a median neighborhood: it adds or removes a condition in the rule sent as a parameter. Its pseudo-code is for example:

```
MedianNeighborhood function (parameter: one rule R, Max size) :
returns one rule
Start
If R is zero
then Modification=Add
Else Modification = Random (Add, Remove)
    // note : the random function randomly returns either add or remove.
    This function can be used with a uniform distribution for example or
    with a preference favoring the addition of a condition or, on the
    contrary, the removal of a condition.
If Modification=Add
Then
    If the number of conditions of R is smaller than Maxsize
    then
        C=GenerateACondition ( )
        Add to the rule R the condition C
    End If
Else
    If the number of conditions of R is greater than 0
    then
        Randomly select a condition C in the rule R
        Eliminate the condition C in R
    End If
End If
Return R
End Function.
```

The GenerateACondition function creates a condition randomly. This condition uses only valid attributes in the "Use Mode Manager" (UMM) module 2, i.e. only attributes not marked Taboo (and not masked). Its pseudo-code is, for example:

```
GenerateACondition function ( ): returns a condition
Start
Select an attribute A randomly from among the non-taboo attributes of
the UMM table.
If A is of a continuous type
Then Operator=Random (<, =>)   //if the attribute is continuous, choose
                                       randomly
                               // Lower operator or higher operator or
                               //equal.
```

-continued

```
Else Operator=Random (=,!=)    //if the attribute is discrete, choose
                                 randomly
                               // equal operator or operator
                                 different from.
Select a value V drawn at random in Dom(A).
Build the condition C : A Operator V
Return C
End Function.
```

1.4.4 Examples of Other Embodiments of the CPG Module

For an exhaustive exploration of all the rules with a maximum of Cmax conditions, another embodiment consists in identifying each rule by means of a number consisting of a concatenation, for each condition $401_1$ to $401_{CMAX}$, of the attribute number 402, the operator number 403 and the tested values number 404.

For example, for a rule with a maximum of Cmax conditions, with a set of data having J non-taboo attributes, and with I rows of data, and in using only two types of operator per type of attribute, the total number of rules to be explored is: $(I*J*2)^{Cmax}$, and each rule can be identified by a single number as can be seen in the example illustrated in FIG. 4.

The modification of the "Candidate Partition Generator" module 4 (CPG) for an exhaustive search than consists in sending, for each rule identified by its number, the identification number of the next rule (the VNS parameter becomes unnecessary).

It is also possible to perform an exhaustive exploration by intervals and groups of values. The principle of the embodiment is then taken up in the case of an exhaustive exploration of the space of the rules. However, the method by which the values of the different attributes are numbered, and hence explored, is modified.

In the case of value numbers for each continuous (numerical) attribute, instead of taking all the values made, only a subset of the discretized values is explored. The discretization can be done according to one of the classic methods of the prior art in statistics: equal frequencies or intervals of a same width.

For the discrete attributes, the method is restricted to exploring solely values having a frequency greater than a given threshold (for example 5%), and a value coming from the grouping of values of low frequency.

1.5 The PSO (Partition Selector Optimizer) Module

1.5.1 Principle of the PSO Module

The "Partition Selector Optimizer" module 5 asks the "Candidate Partition Generator" (CPG) module 4 to generate a first partition candidate. The CPG module 4 sends back a rule equivalent to a data partition. Then this partition is sent to the "Variability Indicator Computing" (VIC) module 3 which evaluates it. If this partition is better than the preceding one, the new partition replaces the preceding one.

1.5.2 Description of an Embodiment of the PSO Module

The pseudo-code of this module 5 is for example:

```
PSO module (parameter E: set or subset of data): returns a rule
corresponding to the best partition found
Start
R=zero       // or another initial starting rule
I = +∞
```

-continued

```
Repeat
    Send R to the CPG module 4 with a VNS neighborhood parameter
    Let R' be the next rule received in return from the CPG module 4
    Let P1 be the set corresponding to the data of E for which R' is true
    Let P2 be the set corresponding to the data of E for which R' is false
    Send the partition P=(P1, P2) to the VIC module 3 to evaluate the
    partition
    Let I' be the value of the indicator returned from the VIC module 3
    If I' is smaller than I      // case of improvement
    Then
        update R=R'
        update I=I'
        Modify the VNS exploration neighborhood in diminishing it
    (case a)
    Else
        Modify the VNS exploration neighborhood in increasing it (case
    b)
    End If
While not (exploration terminated)
Return R
End algorithm.
```

Here are examples of stopping conditions for the "exploration terminated" test: either after a given number of explored rules (the case of a stochastic CPG module 4), or after all the possible rules have been evaluated (the case of a CPG module 4 with exhaustive search of the rules)

In the case of a stochastic exploration by the CPG module 4, the VNS parameter corresponds to a function of a temperature T. A low temperature corresponds to a neighborhood that is near. A high temperature corresponds to a distant neighborhood. The temperature is increased (gradually) whenever the rule R' does not improve the current rule (case a). The temperature is lowered again (to a minimum threshold) whenever the rule R' improves the current rule (case b).

In the case of an exhaustive exploration by the CPG module, the parameter VNS is not used: the module returns the rule R' which is the successor of the rule R in the numbering of the space of the rules.

1.5.3 Description of an Improved Embodiment of the PSO Module

In order to reduce the risk of overlearning of the decision tree, it is useful to evaluate the quality of the partition is not only on the set E of the original data but also on a set of tests F.

A second indicator $I_F$ is managed in parallel with I. Thus this code, which enables the prevention of overlearning, consists in evaluating also R' on a set F and in verifying that, on the set F also, an indicator $I_F$ is improved by R' relative to R. This test is performed only if I is already improved on E by R'. If an improvement of the indicator I on the set E is detected, whereas there is no improvement of $I_F$ on F, then an overlearning counter is implemented. Beyond a certain threshold for this counter, the procedure of the PSO module is halted. Besides, a rule is chosen only if it improves I and $I_F$.

1.6 The Main Module (Main)

1.6.1 Principle of the Main Module

The main module 6 manages the MHI (man/machine interface) inputs/outputs, the overall coordination of the other modules 2 to 5 and the generation of the decision tree by recursive application of the "Partition Selector Optimizer" module 5.

1.6.2 Description of an Embodiment of the Main Module

The management of data and of a data dictionary with continuous or discrete attributes (for example a data table referenced 1 in FIG. 2) is identical to what is known in the prior art and shall therefore not be explained here.

The application of an existing decision tree to an existing set of data is identical to what is known in the prior art and is therefore not explained here (output element referenced 8 in FIG. 2).

The generation of a decision tree constitutes a field well known in the prior art and is therefore not specified here in all its details (output element referenced 8 in FIG. 12). In particular, the management of information in a binary tree and the construction of a binary tree are not specified in detail. Only the principles of interaction of the different modules are specified.

Figure 5:
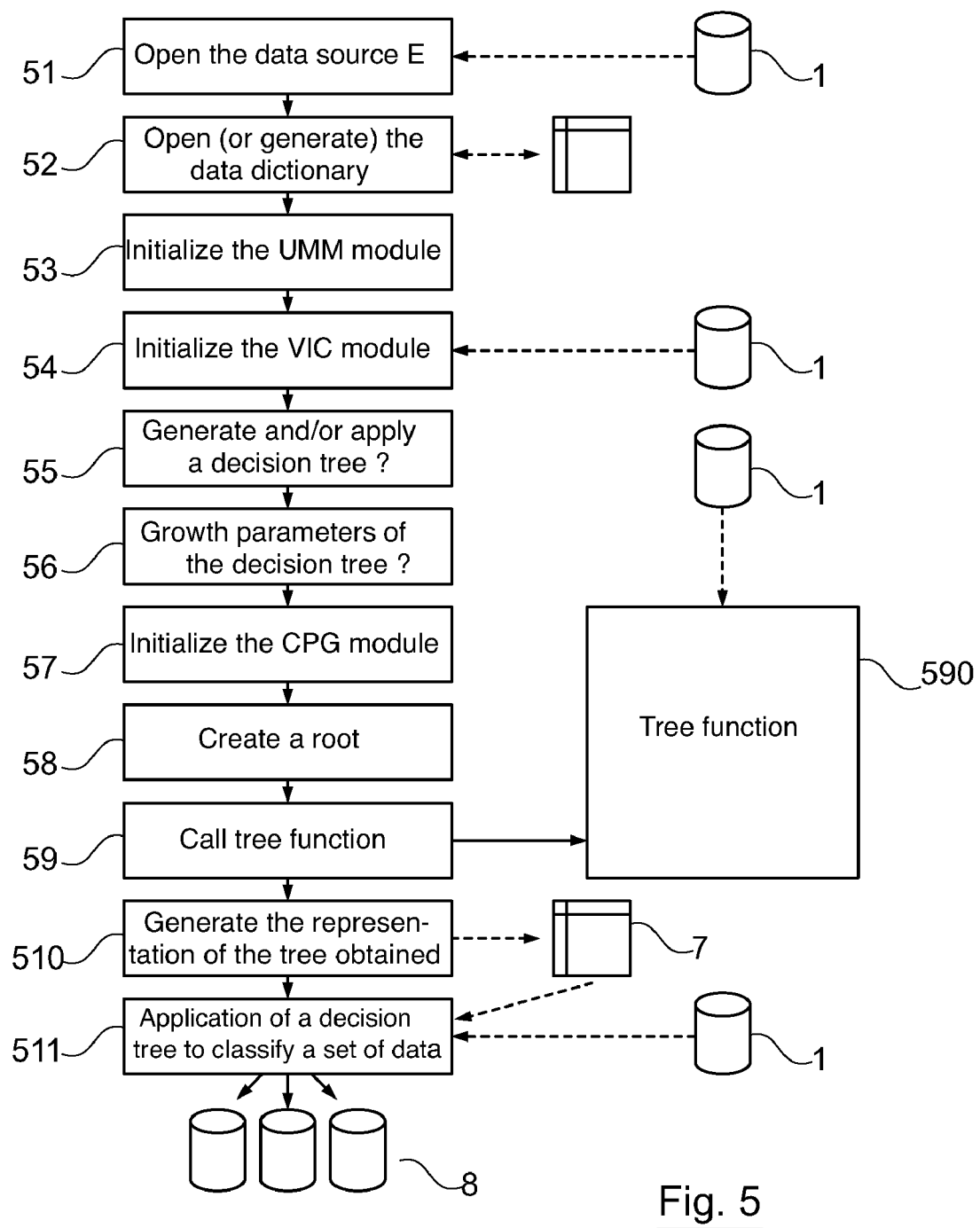
FIG. 5 is a flow chart of a particular embodiment of the method for the generation of a decision tree and/or application of a decision tree to data.

An example of a pseudo-code of the main module (Main) 6 is presented here below for the decision tree generation part. The references of steps of the flow chart of FIG. 5 are indicated between square brackets at different places within this pseudo-code, in order to show the link between the pseudo-code of the main module 6 and the method according to an embodiment of the invention for the generation of a decision tree and/or the application of a decision tree to data.

Main module ( ):

Start

Ask user for the name of the data source E [step 51]

Open the data source E [step 51]

Open (or generate) the data dictionary to have the type of each attribute $A_i$ [step 52]

Initialize the UMM module 2 in asking the user which type of modeling he wishes to perform, and the role that he wishes to give to each variable [step 53]

Initialize the VIC module 3 in carrying out an operation on the data E in order to determine the value domains $Dom(A_i)$ for each attribute $A_i$ [step 54]

Ask the user if he wishes to generate a decision tree and/or apply a decision tree to the data [step 55]

Ask the user for the growth parameters of the decision tree that he wishes to generate [step 56]:

max number of nodes: maxNode max depth: maxDepth maximum number of conditions per rule: maxCondition //etc. . . . .

Initialize the CPG module 4 (maxCondition parameter) [step 57]

//Call tree function [referenced 590 in FIG. 5] having as parameters, the data E as well as the growth parameters of the tree A=create a root [step 58]

A=Tree(E, parameters . . . ) [step 59]

Generate the representation of the tree obtained [step 510]

End algorithm.

The pseudo-code of the Tree function [referenced 590 in FIG. 5] is for example the following:

Tree Function (parameters E: data, A: tree, parameters: maxNode, maxDepth, maxCondition . . . )

Start

If A has not reached its maximum parameters

Then

Find the best partitioning rule R by calling up the PSO module 5

Let $P_1$ be the set corresponding to the data of E for which R is true

Let $P_2$ be the set corresponding to the data of E for which R is false

Store R in A, along with the statistics on the sets $P_1$ and $P_2$

If $P_1$ is not vacant then Tree ($P_1$, LeftChild (A), parameters . . . )

If $P_2$ is not vacant then Tree ($P_2$, RightChild (A), parameters . . . )

End If

Return A

End Function.

In FIG. 5, the step referenced 511 is the application of a decision tree 7 (generated beforehand) to classify a set of data 1, in assuming that it is what the user asked during the step referenced 55. The pieces of data classified according to the decision tree are referenced 8, as in FIG. 2. It must be noted that the passage from the step referenced 55 to the step referenced 511 is made trivially if the user wishes only to re-use an already generated decision tree.

Finally, FIG. 6 presents the structure of the device according to the embodiment of FIG. 2. It has a memory M 61, and a processing unit 60 equipped with a microprocessor µP, which is driven by a computer program (or application) Pg 62 in order to implement the method illustrated in FIG. 5 (method for the generation of a decision tree and/or application of a decision tree to data). The processing unit 60 receives a set of data 1 at input. The µP processes this data according to the instructions of the program Pg 62, to generate a decision tree 7 or data 8 (classified according to a decision tree generated beforehand).

One or more embodiments of the present disclosure therefore overcome drawbacks of the prior art.

More specifically, at least one embodiment provides a technique for unifying the supervised and unsupervised approaches in one and the same system, so that it is possible to use the same tool for generating a decision tree to perform:

either unsupervised classification (exploration tree model), or supervised classification with one target variable (simple explanatory model)

or supervised classification with several target variables (multi-criterion explanatory model).

A unification of supervised and unsupervised approaches such as may have one or more different types of optional advantages, including but not limited to:

functionality: it becomes possible, with a decision tree, to perform multi-criterion analyzes on several target variables at a time. For example, it is possible to search for a model that explains the amount of an invoice as well as the duration of a customer's loyalty to a firm as a function of other parameters;

productivity: only one multi-function tool for data analysis: it is no longer necessary to have one method to perform a supervised analysis, and another method to perform an unsupervised analysis;

simplification in the deployment of models in an information system for example, resulting from processing homogeneity.

At least one embodiment provides a technique of this kind for the generation of decision trees with multivariate tests, namely tests on a number of attributes not limited to one (as is generally the case with other decision trees of the CART, C5 and other types).

At least one embodiment provides a technique of this kind that is simple to implement and costs little.

Although the present invention has been described with reference to preferred embodiments, workers skilled in the art will recognize that changes may be made in form and detail without departing from the spirit and scope of the invention.

What is claimed is:

1. A method comprising:
generating with a computer a classification tree as a function of a classification model and from a set of data to be classified, described by a set of attributes, said set of data being a set of documents of a documentary database;
obtaining said classification model, the classification model comprising defining a mode of use for each attribute, which comprises:
marking said attribute "target" if the attribute has to be explained, or "not target" if the attribute has not to be explained; and
marking said attribute "taboo" if the attribute has not to be used as explanatory, or "not taboo" if the attribute has to be used as explanatory; "target" and "taboo" being two properties not exclusive of each other, and wherein, said classification model belongs to the group comprising:
supervised classification models with one target attribute, in each of which a single attribute is marked target and taboo, the attributes that are not marked target being not marked taboo;
supervised classification models with several target attributes, in each of which at least two attributes, but not all the attributes, are marked target and taboo, the attributes not marked target being not marked taboo; and
unsupervised classification models, in each of which all the attributes are marked target and at least one attribute is not marked taboo.

2. A method according to claim 1 wherein, among the unsupervised classification models, the following can be distinguished:
those in each of which all the attributes are marked target, and no attribute is marked taboo; and
those in each of which all the attributes are marked target, and at least one attribute, but not all the attributes, is marked taboo.

3. A method according to claim 1, wherein defining the mode of use for each attribute also comprises:
marking said attribute "masked" if the attribute has not to be taken into account to define said classification model, or "not masked" if the attribute has to be taken into account to define said classification model, "masked" being a property not exclusive of the "target" and "taboo" properties.

4. A method according to claim 1, said classification tree comprising at least one node enabling the definition of a partition on a data subset received by said node, each node being a set of partitioning rules comprising at least one rule defined by at least one condition on at least one of the attributes wherein, to generate the set of rules of each node, the method comprises the following steps, performed iteratively so long as at least one end-of-exploration criterion has not been verified:
a) obtaining a new set of rules enabling a definition of a new partition on the data subset received by the node, condition or conditions that define each rule pertaining solely to one or more attributes not marked taboo;
b) making a first evaluation of a quality of the new partition, by obtaining a new value of a first indicator computed with the set of data, only attributes marked target influencing said first indicator; and
c) if the quality of the new partition, evaluated with the first criterion, is greater than that of the partitions evaluated during the preceding iterations, also with the first criterion, a new value of the first indicator is stored and becomes a current optimal value, and the new set of rules is stored and becomes a current optimal set of rules,
so that, ultimately, the set of rules of said node is the current optimal set of rules at the time when an end-of-exploration criterion is verified.

5. A method according to claim 4, wherein the obtaining of a new value of the indicator, for a new partition, comprises the following steps:
a weight equal to one is assigned to each of original attributes marked target and a weight equal to zero is assigned to each of original attributes not marked target;
the set of original attributes is re-encoded as a set of attributes re-encoded $Z_1 \ldots Z_Q$ such that:
if an original attribute is of a discrete type and possesses N different modalities, the original attribute is re-encoded according to a full disjunctive re-encoding into N re-encoded attributes having [0; 1] as a value domain, each of the N re-encoded attributes being assigned a weight identical to that of an original attribute from which the re-encoded attribute is derived;
if an original attribute is of a continuous type, the original attribute is re-encoded as a re-encoded attribute, in standardizing the re-encoded attribute's value domain at [0; 1], said re-encoded attribute being assigned a weight identical to that of an original attribute from which the re-encoded attribute is derived;
the new partition is re-encoded in the space of the re-encoded attributes; and
an Intra-Class Inertia of the new partition, re-encoded in the space of the re-encoded attributes, is computed.

6. A method according to claim 5, wherein the Intra-Class Inertia is defined by:

$$Intra(P) = \sum_{j=1}^{K} \left( \sum_{x_i \in C_j} p_i d^2(x_i, g_k) \right)$$

where P is a partition of n points, formed by K subsets $C_1 \ldots C_K$,
d(.) is a function of distance between two points,
$p_i$ is the weight of the point number i, the sum of the weights $p_i$ being equal to one, and
$g_k$ is the center of gravity of the set of points belonging to the subset $C_k$,
and wherein the distance function d(.), for the data re-encoded in the space of the attributes re-encoded $Z_1 \ldots Z_Q$, is defined by:

$$d(d_a, d_b) = \sqrt{\sum_{j=1}^{Q} (DistanceZ_j(Z_{ja}, Z_{jb}) poidsZ(j))^2}$$

where $d_a(Z_{1a}, Z_{2a}, \ldots Z_{Qa})$ and $d_b(Z_{1b}, Z_{2b}, \ldots Z_{Qb})$ are two pieces of data re-encoded in the space of the re-encoded data $Z_1 \ldots Z_Q$, and:

Distance $Z_j(x_j,y_j)=|x_j-y_j|$ if $Z_j$ is a re-encoded attribute coming from a continuous type of attribute, Distance $Z_j(x_j,y_j)=|x_j-y_j|/2$ if $Z_j$ is a re-encoded attribute coming from a full disjunctive re-encoding of a discrete attribute.

7. A method according to claim 4, wherein the step of obtaining said new set of rules, enabling the definition of said new partition, is performed according to a mode of stochastic generation of the partitions.

8. A method according to claim 7, wherein the mode of stochastic generation of the partition is based on a combinatorial optimization meta-heuristic of the VNS or "variable neighborhood search" type.

9. A method according to claim 1, said classification tree comprising at least one node enabling the definition of a partition on a data subset received by said node, each node being a set of partitioning rules comprising at least one rule defined by at least one condition on at least one of the attributes wherein, to generate the set of rules of each node, the method comprises the following steps, performed iteratively so long as at least one end-of-exploration criterion has not been verified:
   a) obtaining a new set of rules enabling the definition of a new partition on the data subset received by the node, condition or conditions that define each rule pertaining solely to one or more attributes not marked taboo;
   b) making a first evaluation of a quality of the new partition, by obtaining a new value of a first indicator computed with the set of data, only attributes marked target influencing said first indicator; and
   c) if the quality of the new partition, evaluated with the first criterion, is greater than that of the partitions evaluated during the previous iterations, with the first criterion, then:
      a second evaluation is made of a quality of the new partition, by obtaining a new value of a second indicator, having a same nature as the first indicator but being computed with a subset of test data;
      if the quality of the new partition, evaluated with the second criterion, is greater than that of the partition evaluated during the previous iterations, with the second criterion, the new values of the first and second indicators are stored and become current optimal values and the new set of rules is stored and becomes a current optimal set of rules, and
      if the quality of the new partition, evaluated with the second criterion, is lower than or equal to that of the partition evaluated during the previous iterations, with the second criterion, a counter is implemented and, if the counter has reached a determined threshold, an end-of-exploration criterion is considered to have been verified; if not the new values of the first and second indicators are stored and become current optimal values and the new set of rules is stored and becomes a current optimal set of rules.

10. A computer-readable storage memory, which may be totally or partially detachable, comprising a set of instructions stored thereon and executable by said computer to implement a method for the generation of a classification tree as a function of a classification model and from a set of data to be classified, described by a set of attributes, said set of data being a set of documents of a documentary database, wherein the method comprises obtaining said classification model, the classification model comprising defining a mode of use for each attribute, which comprises:

marking said attribute "target" if the attribute has to be explained, or "not target" if the attribute has not to be explained; and marking said attribute "taboo" if the attribute has not to be used as explanatory, or "not taboo" if the attribute has to be used as explanatory;

"target" and "taboo" being two properties not exclusive of each other, and wherein, said classification model belongs to the group comprising:

supervised classification models with one target attribute, in each of which a single attribute is marked target and taboo, the attributes that are not marked target being not marked taboo;

supervised classification models with several target attributes, in each of which at least two attributes, but not all the attributes, are marked target and taboo, the attributes not marked target being not marked taboo; and unsupervised classification models, in each of which all the attributes are marked target and at least one attribute is not marked taboo.

11. A device for the generation of a classification tree as a function of a classification model and from a set of data to be classified, described by a set of attributes, said set of data being a set of documents of a documentary database, wherein the device comprises a memory and means for obtaining said classification model, the means themselves comprising means to define a mode of use for each attribute which comprise:

means for marking said attribute "target" if the attribute has to be explained, or "not target" if the attribute has not to be explained: and means for marking said attribute "taboo" if the attribute has not to be used as explanatory, or "not taboo" if the attribute has to be used as explanatory, "target" and "taboo" being two properties not exclusive of each other, and wherein, said classification model belongs to the group comprising:

supervised classification models with one target attribute, in each of which a single attribute is marked target and taboo, the attributes that are not marked target being not marked taboo;

supervised classification models with several target attributes, in each of which at least two attributes, but not all the attributes, are marked target and taboo, the attributes not marked target being not marked taboo; and unsupervised classification models, in each of which all the attributes are marked target and at least one attribute is not marked taboo.

* * * * *